(12) United States Patent
Zuo et al.

(10) Patent No.: US 12,007,906 B2
(45) Date of Patent: Jun. 11, 2024

(54) METHOD AND APPARATUS FOR FIRST OPERATING SYSTEM TO ACCESS RESOURCE OF SECOND OPERATING SYSTEM

(71) Applicant: Huawei Technologies Co., Ltd., Shenzhen (CN)

(72) Inventors: Peng Zuo, Shenzhen (CN); Xiaoqiang Du, Shenzhen (CN); Yong Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 17/749,627

(22) Filed: May 20, 2022

(65) Prior Publication Data

US 2022/0276968 A1    Sep. 1, 2022

Related U.S. Application Data

(63) Continuation of application No. PCT/CN2020/102032, filed on Jul. 15, 2020.

(30) Foreign Application Priority Data

Nov. 22, 2019    (CN) .......................... 201911156149.8

(51) Int. Cl.
*G06F 12/109* (2016.01)
*G06F 9/54* (2006.01)
*G06F 21/52* (2013.01)

(52) U.S. Cl.
CPC ............ *G06F 12/109* (2013.01); *G06F 9/545* (2013.01); *G06F 21/52* (2013.01); *G06F 2212/657* (2013.01); *G06F 2221/034* (2013.01)

(58) Field of Classification Search
CPC ............ G06F 12/1009; G06F 12/1036; G06F 12/109; G06F 12/1491; G06F 21/52;
(Continued)

(56) References Cited

U.S. PATENT DOCUMENTS 6,697,070 B1 * 2/2004 Katsura .................... G09G 5/26
345/469
10,438,019 B2 * 10/2019 Viswanathan .......... G06F 21/31
(Continued)

FOREIGN PATENT DOCUMENTS

CN      102968342 A      3/2013
CN      105068859 A      11/2015
(Continued)

OTHER PUBLICATIONS

Pinto Sandro et al, "Demystifying Arm TrustZone:A Comprehensive Survey," ACM Computing Surveys, ACM, New York, NY, US, US, vol. 51, No. 6, Jan. 28, 2019, 36 pages.

*Primary Examiner* — Hashem Farrokh
(74) *Attorney, Agent, or Firm* — Conley Rose, P.C.

(57) ABSTRACT

A method includes configuring a memory for storing a kernel page table and a user page table to low-order address space, and reserving high-order address space, obtaining register configuration information of a kernel page table of a second operating system from the second operating system, and configuring a register of the high-order address space of a first operating system based on the register configuration information of the kernel page table of the second operating system such that the high-order address space is enabled to directly access a kernel resource of the second operating system.

20 Claims, 11 Drawing Sheets

(58) Field of Classification Search
CPC ............... G06F 21/53; G06F 2209/463; G06F 2212/1016; G06F 2212/1052; G06F 2212/657; G06F 2221/034; G06F 9/545
USPC ........................................................ 711/203
See application file for complete search history.

(56) References Cited

U.S. PATENT DOCUMENTS

| | | | |
|---|---|---|---|
| 11,074,114 B1* | 7/2021 | Kostyushko | ........ G06F 9/45537 |
| 2003/0120856 A1 | 6/2003 | Neiger et al. | |
| 2004/0237086 A1* | 11/2004 | Sekiguchi | ............ G06F 9/4843 |
| | | | 714/E11.167 |
| 2005/0216696 A1 | 9/2005 | Kawaguchi | |
| 2008/0065856 A1 | 3/2008 | Kawaguchi | |
| 2008/0307425 A1* | 12/2008 | Tripathi | ................ G06F 9/5077 |
| | | | 718/104 |
| 2014/0123320 A1 | 5/2014 | Isozaki et al. | |
| 2015/0089213 A1 | 3/2015 | Isozaki et al. | |
| 2015/0370726 A1 | 12/2015 | Hashimoto et al. | |
| 2018/0239896 A1 | 8/2018 | Kato et al. | |
| 2018/0268127 A1* | 9/2018 | Poeluev | .................. G06F 21/53 |
| 2019/0243990 A1* | 8/2019 | Wei | ......................... G06F 21/74 |
| 2020/0074088 A1* | 3/2020 | Fu | ......................... H04L 9/0897 |
| 2021/0011996 A1 | 1/2021 | Li et al. | |
| 2022/0276968 A1 | 9/2022 | Zuo et al. | |

FOREIGN PATENT DOCUMENTS

| | | |
|---|---|---|
| CN | 110245001 A | 9/2019 |
| CN | 110348252 A | 10/2019 |
| CN | 111124664 A | 5/2020 |
| JP | 2014089644 A | 5/2014 |
| JP | 2015064677 A | 4/2015 |
| JP | 2016009884 A | 1/2016 |
| JP | 2017162483 A | 9/2017 |
| KR | 100624668 B1 | 9/2006 |

\* cited by examiner

METHOD AND APPARATUS FOR FIRST OPERATING SYSTEM TO ACCESS RESOURCE OF SECOND OPERATING SYSTEM

CROSS-REFERENCE TO RELATED APPLICATIONS

This is a continuation of International Patent Application No. PCT/CN2020/102032 filed on Jul. 15, 2020, which claims priority to Chinese Patent Application No. 201911156149.8 filed on Nov. 22, 2019. The disclosures of the aforementioned applications are hereby incorporated by reference in their entireties.

TECHNICAL FIELD

This application relates to the field of computer technologies, and more specifically, to a method and an apparatus for a first operating system to access a resource of a second operating system.

BACKGROUND

With the continuous development of computer technologies, security of electronic devices attracts increasing attention. A rich execution environment (REE) technology on the electronic devices cannot meet a security requirement. To improve security, a concept of trusted execution environment (TEE) is provided, to ensure that sensitive data is processed in a secure and trusted isolation operating system without being tampered with by another malicious third-party software application. A TEE operating system (OS) is an execution environment that coexists with an REE OS on the electronic device, provides a reliable security service for the REE OS, has its own execution space, and has a higher security level than the REE OS. In addition, software and hardware resources that can be accessed by the TEE OS are separated from the REE OS. The TEE OS is an isolation operating system. When the TEE OS needs to access a peer REE OS resource, the TEE OS cannot directly access the REE OS resource due to different page tables in the two operating systems. Consequently, a dynamic integrity measurement module deployed in the TEE OS has poor performance in providing integrity protection for the REE OS. Therefore, how to improve performance of a first operating system in accessing a resource of a second operating system becomes an urgent problem to be resolved.

SUMMARY

This application provides a method and an apparatus for a first operating system to access a resource of a second operating system. High-order address space in the first operating system is reserved, and the first operating system reuses a register configuration of a kernel page table of the second operating system such that the first operating system can enable the high-order address space to directly access a resource in kernel space of the second operating system. This improves performance of the first operating system in accessing the resource of the second operating system.

According to a first aspect, a method for a first operating system to access a resource of a second operating system is provided, and may be performed by the first operating system, or may be performed by a chip or a circuit in the first operating system. For ease of description, the following uses an example in which the first operating system performs the method for description.

The method for the first operating system to access the resource of the second operating system includes kernel space and user space of the first operating system are configured in first address space of the first operating system, and second address space is reserved for the second operating system. Virtual memory address space of the first operating system includes the first address space and the second address space. The first operating system obtains register configuration information of a kernel page table of the second operating system. The first operating system configures a second register of the first operating system based on the register configuration information of the kernel page table of the second operating system. The second register corresponds to the second address space of the first operating system. The first operating system accesses a resource in kernel space of the second operating system by using the second address space.

According to the method for the first operating system to access the resource of the second operating system provided in this embodiment of this application, the first operating system configures, by reserving high-order address space in the first operating system and based on the register configuration information of the kernel page table of the second operating system, the second register corresponding to the high-order address space of the first operating system such that the first operating system can directly access the resource in the kernel space of the second operating system when enabling the reserved high-order address space, which improves performance of the first operating system in accessing the resource of the second operating system.

With reference to the first aspect, in some implementations of the first aspect, the first address space is high-order address space, the second address space is low-order address space, and a range of the high-order address space of the first operating system is consistent with a range of kernel address space of the second operating system.

It should be understood that the foregoing "first address space" and "second address space" respectively refer to low-order address space and high-order address space in the first operating system, and are described as "first address space" and "second address space" to avoid a limitation on description. The protection scope of this application is not limited.

In addition, to achieve that the first operating system can directly access the resource in the kernel space of the second operating system when enabling the reserved high-order address space, the range of the high-order address space of the first operating system is consistent with the range of the kernel address space of the second operating system.

With reference to the first aspect, in some implementations of the first aspect, the method further includes that a first operating system receives kernel symbol table information sent by the second operating system. The first operating system parses the kernel symbol table information to obtain a conversion relationship of high-order address space of the second operating system, obtains user page table base address information of a user process, reads user page table entry content level by level by using the conversion relationship, and accesses a resource in user space of the second operating system.

Further, the first operating system may obtain the kernel symbol table information of the second operating system such as to obtain the conversion relationship of the high-order address space of the second operating system and the user page table base address information of the user process. On a premise that the conversion relationship is known, the first operating system may read the user page table entry content level by level, and access the resource in the user space of the second operating system.

With reference to the first aspect, in some implementations of the first aspect, that kernel space and user space of the first operating system are configured in first address space of the first operating system includes the first operating system stores a kernel page table and a user page table in the first operating system in a page table memory of the first address space. The first operating system configures the page table memory of the first address space to a first register of the first operating system.

A manner of reserving high-order address space is provided. Both the kernel page table and the user page table are stored in a page table memory of low-order address space.

With reference to the first aspect, in some implementations of the first aspect, that second address space is reserved for the second operating system includes the first operating system reserves the second address space based on the high-order address space of the second operating system.

Further, when reserving the high-order address space, the first operating system refers to a range of the high-order address space of the second operating system such that the first operating system can successfully configure, based on the register configuration information of the kernel page table of the second operating system, the second register corresponding to the high-order address space of the first operating system.

With reference to the first aspect, in some implementations of the first aspect, the method further includes that the first operating system receives a request message sent by the second operating system. The request message carries the kernel symbol table information and the register configuration information of the kernel page table of the second operating system.

According to the method for the first operating system to access the resource of the second operating system provided in this embodiment of this application, that the first operating system obtains the kernel symbol table information and the register configuration information of the kernel page table of the second operating system may be that the received request message sent by the second operating system carries the kernel symbol table information and the register configuration information of the kernel page table of the second operating system.

With reference to the first aspect, in some implementations of the first aspect, a client application CA is deployed in the first operating system. That the first operating system reserves second address space for the second operating system includes: In a CA initialization process, a configuration of a register of a kernel page table of the first operating system is modified based on the register configuration information of the second operating system such that a configuration of the second register of the first operating system is the same as a configuration of a high-order register of the second operating system.

According to the method for the first operating system to access the resource of the second operating system provided in this embodiment of this application, the client application (CA) is deployed in the first operating system. The CA is initialized to modify the configuration of the register of the first operating system based on the received register configuration information of the second operating system such that the configuration of the second register of the first operating system is the same as the configuration of the high-order register of the second operating system. This provides a feasible solution for how the first operating system reuses the configuration of the register of the second operating system.

With reference to the first aspect, in some implementations of the first aspect, before storing a kernel page table and a user page table in the first operating system in a page table memory of the first address space, the method further includes: The first operating system adds user inaccessible permission control to the kernel page table; and the first operating system adds privileged execute never (PXN) protection to the user page table.

According to the method for the first operating system to access the resource of the second operating system provided in this embodiment of this application, the kernel page table and the user page table in the first operating system are stored in a same page table memory. To meet security requirements of the kernel page table and the user page table, the user inaccessible permission control is added to the kernel page table, and the PXN protection is added to the user page table such that the kernel page table and the user page table are securely independent.

With reference to the first aspect, in some implementations of the first aspect, the register configuration information of the kernel page table of the second operating system includes configuration information of address translation controller, configuration information of memory attribute controller, and configuration information of kernel space page table base address register.

According to the method for the first operating system to access the resource of the second operating system provided in this embodiment of this application, the register configuration information of the second operating system received by the first operating system includes a plurality of types of configuration information such as to provide more comprehensive selections for the first operating system to reuse the register configuration of the second operating system.

With reference to the first aspect, in some implementations of the first aspect, a dynamic integrity measurement module is deployed in the first operating system, and the dynamic integrity measurement module is configured to provide a security service for the second operating system.

According to the method for the first operating system to access the resource of the second operating system provided in this embodiment of this application, the first operating system may include the dynamic integrity measurement module to provide security protection for the second operating system.

With reference to the first aspect, in some implementations of the first aspect, when an exception occurs while the first operating system accesses the resource in the kernel space of the second operating system, the first operating system sends exception-related information to the second operating system.

According to the method for the first operating system to access the resource of the second operating system provided in this embodiment of this application, when an exception occurs in cross-system resource access, the first operating system may notify the accessed second operating system of related information about the exception such that the second operating system can learn that the access exception occurs.

With reference to the first aspect, in some implementations of the first aspect, a remote procedure call RPC service is deployed in the first operating system. That the first operating system sends exception-related information to the second operating system includes the RPC service sends the exception-related information to the second operating system.

According to the method for the first operating system to access the resource of the second operating system provided in this embodiment of this application, the remote procedure call RPC service may be deployed in the first operating system. When the access exception occurs, the first operating system notifies the second operating system of exception information by using the RPC service.

According to a second aspect, a method for a first operating system to access a resource of a second operating system is provided, and may be performed by the second operating system, or may be performed by a chip or a circuit in the second operating system. For ease of description, the following uses an example in which the second operating system performs the method for description.

The method for the first operating system to access the resource of the second operating system includes that the second operating system obtains register configuration information of a kernel page table of the second operating system. The second operating system sends the register configuration information of the kernel page table of the second operating system to the first operating system.

According to the method for the first operating system to access the resource of the second operating system provided in this embodiment of this application, the register configuration information of the kernel page table of the second operating system can be obtained from the second operating system of an accessed resource in a cross-system resource access scenario, and the register configuration information of the kernel page table of the second operating system is sent to the first operating system. In this way, the first operating system can reuse a register configuration of the kernel page table of the second operating system, which improves inter-system resource access performance.

With reference to the second aspect, in some implementations of the second aspect, the method further includes that the second operating system obtains kernel symbol table information of the second operating system. The second operating system sends the kernel symbol table information to the first operating system.

According to the method for the first operating system to access the resource of the second operating system provided in this embodiment of this application, the kernel symbol table information of the second operating system can be obtained from the second operating system of the accessed resource in the cross-system resource access scenario, and the kernel symbol table information is sent to the first operating system. In this way, the first operating system can access a user page table of the second operating system level by level, which improves the inter-system resource access performance.

With reference to the second aspect, in some implementations of the second aspect, a kernel driver module is deployed in the second operating system. That the second operating system obtains kernel symbol table information and/or register configuration information of a kernel page table of the second operating system includes the kernel driver module obtains the kernel symbol table information and/or the register configuration information of the kernel page table of the second operating system.

According to the method for the first operating system to access the resource of the second operating system provided in this embodiment of this application, that the kernel symbol table information of the second operating system and the register configuration information of the second operating system can be obtained from the second operating system may be that the kernel driver module is deployed in the second operating system, and the kernel driver module is configured to obtain the kernel symbol table information and the register configuration information of the second operating system.

With reference to the second aspect, in some implementations of the second aspect, the register configuration information of the kernel page table of the second operating system includes configuration information of address translation controller, configuration information of memory attribute controller, and configuration information of kernel space page table base address register.

According to the method for the first operating system to access the resource of the second operating system provided in this embodiment of this application, the register configuration information of the second operating system includes a plurality of types of configuration information such as to provide more comprehensive selections for the first operating system to reuse the register configuration of the second operating system.

According to a third aspect, an apparatus for a first operating system to access a resource of a second operating system is provided. The apparatus for the first operating system to access the resource of the second operating system includes a processor, configured to implement a function of the first operating system in the method described in the first aspect.

Optionally, the apparatus for the first operating system to access the resource of the second operating system may further include a memory, the memory is coupled to the processor, and the processor is configured to implement the function of the first operating system in the method described in the first aspect. In a possible implementation, the memory is configured to store program instructions and data. The memory is coupled to the processor. The processor may invoke and execute the program instructions stored in the memory, and is configured to implement the function of the first operating system in the method described in the first aspect.

Optionally, the apparatus for the first operating system to access the resource of the second operating system may further include a communications interface, and the communications interface is used by the apparatus for the first operating system to access the resource of the second operating system to communicate with another device. When the apparatus for the first operating system to access the resource of the second operating system is the first operating system, the communications interface is a transceiver, an input/output interface, a circuit, or the like.

In a possible design, the apparatus for the first operating system to access the resource of the second operating system includes the processor and the communications interface.

The processor is configured to run a computer program such that the apparatus for the first operating system to access the resource of the second operating system implements any method described in the first aspect.

The processor communicates with the external through the communications interface.

It may be understood that the external may be an object other than the processor, or an object other than the apparatus.

In another possible design, the apparatus for the first operating system to access the resource of the second operating system is a chip or a chip system. The communications interface may be an input/output interface, an interface circuit, an output circuit, an input circuit, a pin, a related circuit, or the like on the chip or the chip system. The processor may alternatively be a processing circuit or a logic circuit.

According to a fourth aspect, an apparatus for a first operating system to access a resource of a second operating system is provided. The apparatus for the first operating system to access the resource of the second operating system includes a processor configured to implement a function of the second operating system in the method described in the second aspect.

Optionally, the apparatus for the first operating system to access the resource of the second operating system may further include a memory, the memory is coupled to the processor, and the processor is configured to implement the function of the second operating system in the method described in the second aspect. In a possible implementation, the memory is configured to store program instructions and data. The memory is coupled to the processor. The processor may invoke and execute the program instructions stored in the memory, and is configured to implement the function of the second operating system in the method described in the second aspect. Optionally, the apparatus for the first operating system to access the resource of the second operating system may further include a communications interface, and the communications interface is used by the apparatus for the first operating system to access the resource of the second operating system to communicate with another device. When the apparatus for the first operating system to access the resource of the second operating system is the second operating system, the communications interface is a transceiver, an input/output interface, a circuit, or the like.

In a possible design, the apparatus for the first operating system to access the resource of the second operating system includes: the processor and the communications interface.

The processor communicates with the external through the communications interface.

The processor is configured to run a computer program such that the apparatus for the first operating system to access the resource of the second operating system implements any method described in the second aspect.

It may be understood that the external may be an object other than the processor, or an object other than the apparatus.

In another possible design, the apparatus for the first operating system to access the resource of the second operating system is a chip or a chip system. The communications interface may be an input/output interface, an interface circuit, an output circuit, an input circuit, a pin, a related circuit, or the like on the chip or the chip system. The processor may alternatively be a processing circuit or a logic circuit.

According to a fifth aspect, a computer-readable storage medium is provided. The computer-readable storage medium stores a computer program. When the computer program is executed by a communications apparatus, the communications apparatus is enabled to implement the method according to any one of the first aspect and the possible implementations of the first aspect.

According to a sixth aspect, a computer-readable storage medium is provided. The computer-readable storage medium stores a computer program. When the computer program is executed by a communications apparatus, the communications apparatus is enabled to implement the method according to any one of the second aspect and the possible implementations of the second aspect.

According to a seventh aspect, a computer program product including instructions is provided. When the instructions are executed by a computer, a communications apparatus is enabled to implement the method according to any one of the first aspect and the possible implementations of the first aspect.

According to an eighth aspect, a computer program product including instructions is provided. When the instructions are executed by a computer, a communications apparatus is enabled to implement the method according to any one of the second aspect and the possible implementations of the second aspect.

According to a ninth aspect, an electronic device is provided, including the apparatus for the first operating system to access the resource of the second operating system shown in the third aspect and the apparatus for the first operating system to access the resource of the second operating system shown in the fourth aspect.

DESCRIPTION OF EMBODIMENTS

The following describes the technical solutions in this application with reference to the accompanying drawings.

Figure 1:
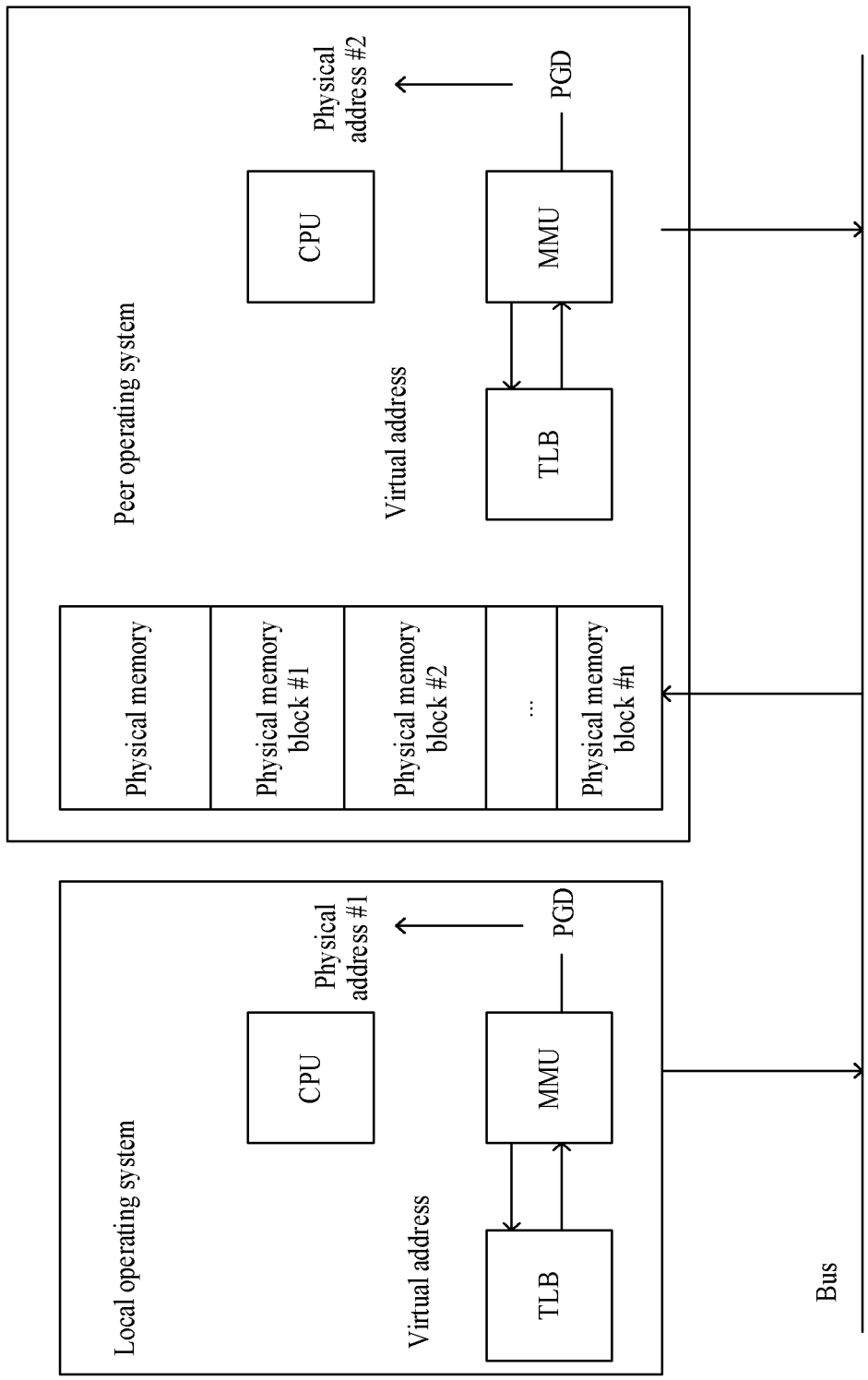
FIG. 1 is a schematic block diagram of two operating systems.

The technical solutions in embodiments of this application may be applied to two operating systems. FIG. 1 is a schematic block diagram of two operating systems. As shown in FIG. 1, the two operating systems include a local operating system and a peer operating system. The local operating system and the peer operating system have independent internal modules such as central processing units (CPUs), memory management units (MMUs), translation lookaside buffers (TLBs), and page global directories (PGDs), and may further have independent external devices. The external devices of the operating systems are not shown in FIG. 1, and this is not limited in this application.

Further, a program in the local operating system is divided into a plurality of programs, and the plurality of programs are separately loaded into a memory. Physically, the plurality of programs does not need to be connected to each other. Logically, a page table is used to string the plurality of programs that are distributed discretely to form a logically continuous program. The program is divided into small blocks of equal length, and these small blocks are called pages. Similarly, the memory is also divided into page frames of the same size as the pages. One page may be loaded into one page frame, and a page table of a current task needs to be provided for the CPU. When executing the program, the CPU searches for a page in a page frame of the memory based on the page table, and then maps a logical address to a physical address. In the two operating systems shown in FIG. 1, when the local operating system needs to access a resource of the peer operating system, limited by different page tables of the local operating system and the peer operating system, the local operating system cannot directly access the resource of the peer operating system. When different operating systems need to access a data resource in a same physical memory, the different operating systems all need to establish a new page table relationship.

For example, as shown in FIG. 1, the local operating system finds a corresponding physical address #1 based on a page table in the local operating system and according to a virtual address #1. The physical address #1 corresponds to a physical memory block #1. The peer operating system finds a corresponding physical address #2 based on a page table in the peer operating system and according to the virtual address #1. The physical address #2 corresponds to a physical memory block #2. The physical memory block #1 is different from the physical memory block #2. Therefore, the local operating system and the peer operating system access different physical memory blocks based on different page tables. If both the local operating system and the peer operating system need to be enabled to find the physical memory block #2 based on the virtual address #1, the page tables in the local operating system and the peer operating system need to include a mapping relationship between the virtual address #1 and the physical memory block #2. That is, the page table in the local operating system needs to be updated such that the local operating system finds the corresponding physical address #2 based on the page table in the local operating system and according to the virtual address #1.

It should be understood that a specific process in which an operating system accesses a physical memory block based on a page table is not limited in this embodiment of this application. For details, refer to specifications in a current protocol. It should be further understood that in this application, two different operating systems in the two operating systems are referred to as the local operating system and the peer operating system are merely examples, and do not constitute any limitation on the protection scope of this application. For example, the local operating system may be referred to as a first operating system, and the peer operating system may be referred to as a second operating system. The local operating system may also be referred to as a security isolation operating system, and the peer operating system may also be referred to as a mainstream operating system. It should be further understood that the two operating systems may also be referred to as a dual system, a multiprocessor system, or the like.

When the first operating system is a TEE OS, and the second operating system is an REE OS, security issues of the REE OS include confidentiality, integrity, availability, and the like. In a possible implementation, a dynamic integrity measurement technology is used to provide an integrity security service for the REE OS. Further, the dynamic integrity measurement technology detects, by analyzing REE OS memory data, whether the REE OS is threatened such as to protect the REE OS memory data from unauthorized modification. For security protection of a dynamic integrity measurement module, security of the dynamic integrity measurement module may be ensured by deploying the dynamic integrity measurement module in the TEE OS. The dynamic integrity measurement module is deployed in the TEE OS, and accesses a REE OS resource, mainly including accessing measurement objects such as a REE OS user process code segment, a kernel code segment, and a dynamic shared library code segment.

However, the dynamic integrity measurement module deployed in the TEE OS needs to monitor integrity of the REE OS resource to ensure that the REE OS is trusted. In this case, because the TEE OS is isolated from the REE OS, the dynamic integrity measurement module cannot efficiently access the REE OS resource in real time. A method for the first operating system to access the resource of the second operating system provided in this embodiment of this application can improve performance of the dynamic integrity measurement module deployed in the TEE OS to access the REE OS resource. The following provides descriptions with reference to the embodiments.

Optionally, the REE OS in this application includes a Linux operating system, an Android operating system, and the like. Further, "first", "second", and various numerical numbers in this application are intended to distinguish between similar objects but do not necessarily indicate a specific order or sequence. It should be understood that data used in such a way are interchangeable in proper circumstances. This is not intended to limit the scope of the embodiments of this application. For example, distinguish between different operating systems. Similarly, in this application, labels such as "#1" and "#2" are also used to distinguish between similar objects, for example, distinguish between different addresses.

Figure 2:
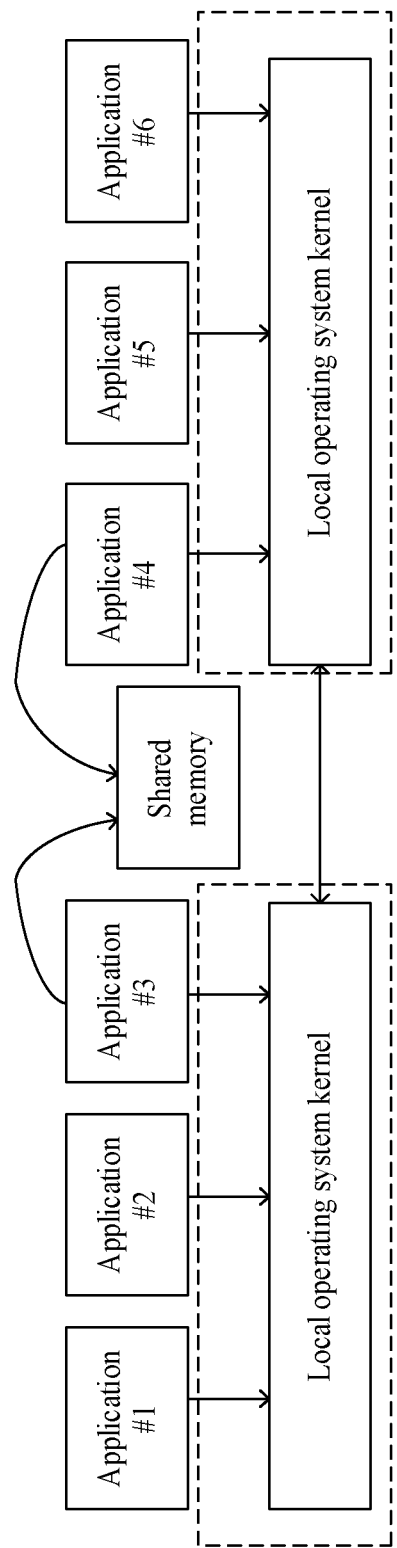
FIG. 2 is a schematic block diagram of a shared memory according to an embodiment of this application.

Further, different operating systems can share a memory. If a shared memory mechanism is used, the local operating system and the peer operating system can access a same physical memory block. A further implementation procedure is shown in FIG. 2. FIG. 2 is a schematic block diagram of a shared memory according to an embodiment of this application.

It can be learned from FIG. 2 that, when the local operating system accesses an application code segment running in the peer operating system, the local operating system needs to know, in advance, a physical address of the application code segment running in the peer operating system. Through physical address exchange between operating systems, the peer operating system actively transfers the physical address to the local operating system. After receiving the physical address, the local operating system actively maps a physical page frame and adds the physical page frame to a page table entry of the local operating system. In this way, the peer operating system and the local operating system can directly access the memory block in a manner similar to the shared memory.

It should be understood that, when physical addresses of process code segments in the peer operating system are discontinuous and present discrete distribution, the local operating system needs to map a large quantity of physical memory blocks. Consequently, performance is very poor. In addition, the local operating system maps all resources of the peer operating system, and security of the local operating system is affected. When the local operating system cannot identify content of the physical memory block, use of the content of the memory block by the local operating system is affected. When page swapping occurs on the peer operating system, an asynchronization problem occurs when the local operating system accesses data in the peer operating system.

Further, the local operating system may further copy a page table resource of the peer operating system to implement an objective of accessing the resource of the peer operating system. For example, the local operating system copies all entries of a kernel page table (or a user page table) of the peer operating system to a page table memory of the local operating system in a software traversal manner, and the local operating system sequentially completes page table entry mapping level by level. In this way, the local operating system and the peer operating system may access same page frame content by using a same page table conversion relationship.

In a paging mechanism in Linux, a page global directory (PGD) includes addresses of several page upper directories (PUDs), the PUD sequentially includes addresses of several page middle directories (PMDs), the PUD further includes addresses of several page table entries (PTEs), and each PTE points to a page frame.

A Linux user page table is used as an example. It is assumed that the local operating system knows a user program virtual address (VA) and a user process page table base address (usually, a page global directory (PGD) address is directly filled in a page table base address register) in the peer operating system. The local operating system traverses from a user page table base address, maps a PGD physical address to a kernel page table of the local operating system, and after the mapping is completed, obtains a PGD virtual address by using a page table conversion relationship in the local operating system, reads content of the virtual address, and obtains entry content. A physical address of a level-1 page table (PUD) is stored. The local operating system obtains a PUD entry virtual address by using the same mechanism, and determines whether a current PUD entry includes a VA that needs to be mapped currently. If the current VA is not included, the PUD entry offsets one level-1 page table granularity. The local operating system continues to determine whether the PUD entry includes the VA, and if the PUD entry does not include the VA, returns an empty address, or if the PUD entry includes the VA, walks a page middle directory entry. The same method is used to locate a real PTE level by level, and finally map the corresponding PTE to the local operating system for use.

It should be understood that when there are a large quantity of page table entries in the peer operating system, a time consumed by the local operating system to copy the page table is very long. To improve performance of the first operating system in accessing the resource of the second operating system, this application provides a method for the first operating system to access the resource of the second operating system. The local operating system reuses a register configuration of the peer operating system such that quick resource access is implemented without performing page table copying, page table synchronization, or the like.

First, to facilitate understanding of the method for the first operating system to access the resource of the second operating system provided in this embodiment of this application, several basic concepts related to this application are briefly described below.

1. TEE.

The TEE is a concept provided by the global platform (GP). The TEE OS is an execution environment that coexists with the REE OS on a device, and provides a security service for the REE OS. The TEE OS has its own execution space, and has a higher security level than the REE OS. In this application, the REE OS and the TEE OS are used as examples for description.

The TEE OS runs in an electronic device, and provides a framework for security between the REE OS and a safe environment (SE). For example, for data such as some small payments or an enterprise virtual private network (VPN), strength of required security protection is not high, a separate SE is not required for protection, and the data cannot be directly placed in the REE OS, to prevent an attack due to openness of the REE OS. Therefore, the TEE OS may be used to provide security protection for such applications.

In addition, the TEE OS provides a secure execution environment for a trusted application (TA), and also protects confidentiality, integrity, and access permission of TA resources and data. In the TEE, all TAs are mutually independent and cannot access each other without authorization.

The following describes an electronic device provided and designed in the embodiments of this application, a user interface for such an electronic device, and an embodiment for using such an electronic device. In some embodiments, the electronic device may be a portable electronic device that further includes another function, such as a mobile phone, a tablet computer, or a wearable electronic device (such as a smartwatch) having a wireless communication function. An example embodiment of the portable electronic device includes but is not limited to a portable electronic device using iOS®, Android®, Microsoft®, or another operating system. The portable electronic device may alternatively be another portable electronic device, such as a laptop. It should be further understood that, in some other embodiments, the foregoing electronic device may not be the portable electronic device but a desktop computer. In some embodiments, the electronic device may be a smart home appliance, such as a smart speaker or a smart home device. In some embodiments, the electronic device may be a vehicle-mounted device, a vehicle, or the like. The vehicle-mounted device may be a device that has a processing capability, such as an intelligent driving computing platform or an in-vehicle data processing platform, and the foregoing first operating system and the second operating system run on the intelligent driving computing platform or the in-vehicle data processing platform. The intelligent driving computing platform or the in-vehicle data processing platform may be a mobile data center (MDC).

Figure 3:
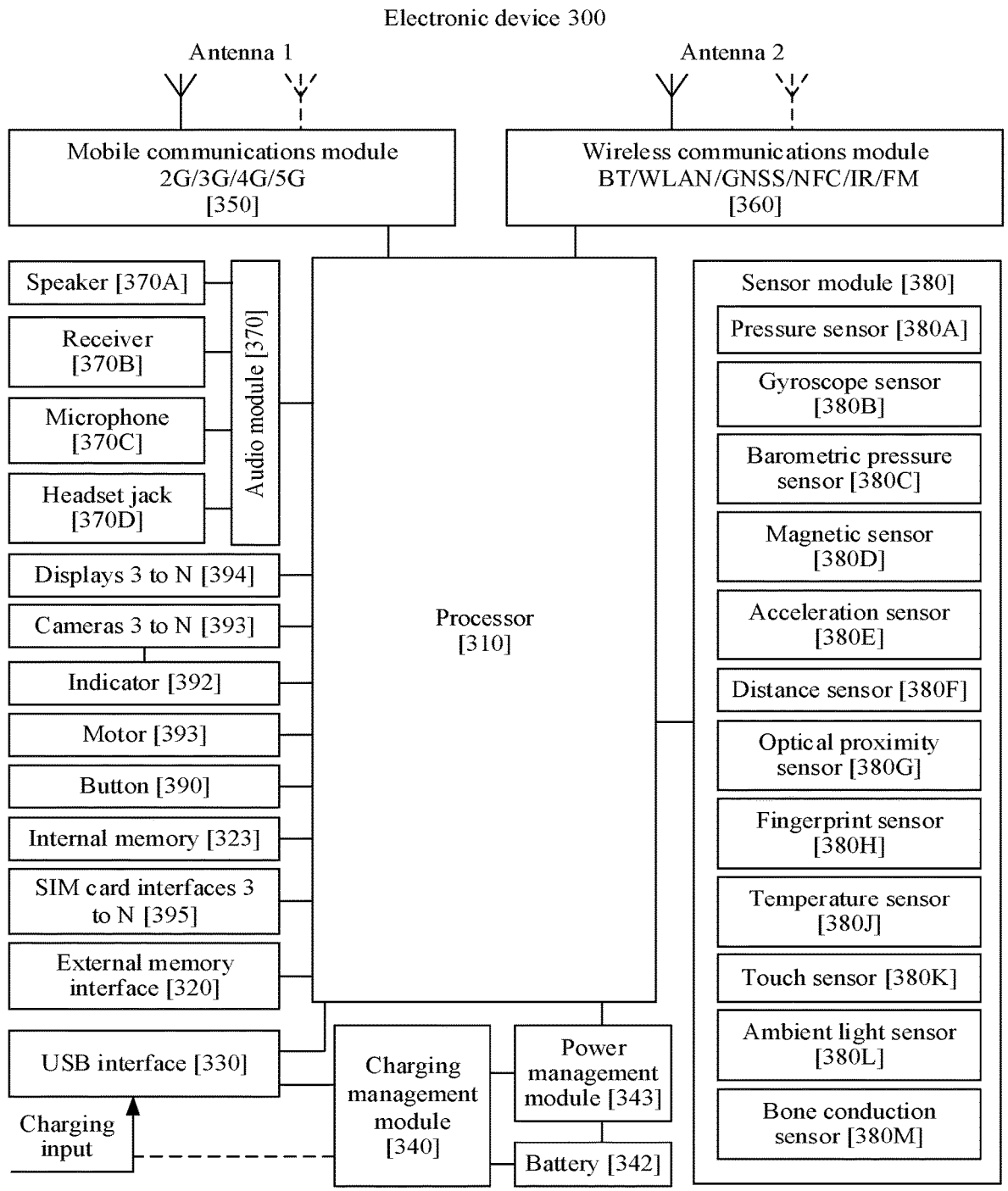
FIG. 3 is a schematic diagram of a structure of an electronic device 300.

For example, FIG. 3 is a schematic diagram of a structure of an electronic device 300. The electronic device 300 may include a processor 310, an external memory interface 320, an internal memory 323, a universal serial bus (USB) interface 330, a charging management module 340, a power management module 343, a battery 342, an antenna 1, an antenna 2, a mobile communications module 350, a wireless communications module 360, an audio module 370, a speaker 370A, a receiver 370B, a microphone 370C, a headset jack 370D, a sensor module 380, a button 390, a motor 393, an indicator 392, a camera 393, a display 394, a subscriber identification module (SIM) card interface 395, and the like. The sensor module 380 may include a pressure sensor 380A, a gyroscope sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It may be understood that the structure shown in this embodiment of this application does not constitute a specific limitation on the electronic device 300. In some other embodiments of this application, the electronic device 300 may include more or fewer components than those shown in the figure, or some components may be combined, or some components may be split, or different component arrangements may be used. The illustrated components may be implemented in hardware or a combination of software and hardware. For example, when the electronic device 300 is an intelligent driving computing platform, the electronic device 300 may not include components such as the sensor module 380, the speaker 370A, the receiver 370B, and the microphone 370C. Instead, data is transmitted to the sensor module 380, the speaker 370A, the receiver 370B, and the microphone 370C in a wired or wireless manner.

2. Page Table.

The page table is a special data structure, is placed in a page table area of operating system space, and stores a mapping from a virtual address to a physical address. The logical address refers to an address generated by a central processing unit (CPU). Further, the logical address generated by the CPU is divided into a page number (p) and a page offset (d). The page number includes a base address of each page in a physical memory, and is used as an index of a page table. The page offset and the base address are combined to determine a physical memory address of the device. The physical address refers to an address seen by a memory unit. If logical address space is $2^m$ and a page size is $2^n$, the most significant (m-n) bits of the logical address indicate the page number, and the least significant n bits indicate the page offset. This implements address mapping from the page number to a physical block number.

A process of converting the logical address into the physical address is as follows: A page table is retrieved by using the page number p, a physical block number of the page is obtained from the page table, and the physical block number of the page is loaded into a physical address register. In addition, an in-page address d is directly sent to an in-block address field of the physical address register. In this way, content in the physical address register is an address of an actual access memory that is obtained by concatenating the physical address and the logical address, and conversion from the logical address to the physical address is completed.

Further, a page of a fixed size is used to describe the logical address space, and page frames of a same size are used to describe physical memory space. An operating system implements page mapping from a logical page to a physical page frame, and is responsible for managing all pages and controlling process running.

3. Translation Lookaside Buffer (TLB).

Page table cache. Each row in the TLB stores a block including a single PTE, and these blocks are page table entries that are most likely to be accessed currently. If the page number is in the TLB, a frame number is obtained to access a memory. Otherwise, the frame number is obtained from the page table in the memory, and stored the frame number in the TLB to access the memory.

4. Dynamic Integrity Measurement Technology.

A process and kernel module integrity in the memory are measured, to detect a malicious attack on a memory running process in time. An operating principle includes periodically/proactively measuring an invariant part in the memory when the operating system is running, calculating a hash value representing integrity of the memory, and comparing the hash value with a reference value, to determine whether a malicious attack modifies a memory mapping of a measurement object. A baseline value may be calculated based on a memory mapping when the process is loaded to the memory for the first time, or a corresponding baseline value may be established offline based on an ELF file corresponding to an application.

The foregoing describes, with reference to FIG. 1, a scenario to which the method for the first operating system to access the resource of the second operating system provided in the embodiments of this application can be applied, and describes in detail, with reference to FIG. 3, an electronic device in which the TEE OS and the REE OS provided in the embodiments of this application can run. The following describes in detail, with reference to the accompanying drawing, the method for the first operating system to access the resource of the second operating system provided in the embodiments of this application.

In addition, to facilitate understanding of the embodiments of this application, the following several descriptions are provided.

First, in this application, "used to indicate" may include "used to directly indicate" and "used to indirectly indicate". When indication information is described as being used to indicate A, the indication information may be used to directly indicate A or used to indirectly indicate A, but it does not necessarily indicate that the indication information includes A.

Information used for indication may be referred to as to-be-indicated information. In a further implementation process, the to-be-indicated information may be indicated in a plurality of manners. For example, the to-be-indicated information may be directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, specific information may also be indicated by using a pre-agreed (for example, specified in a protocol) arrangement sequence of various pieces of information, to reduce indication overheads to some extent.

Second, "first", "second", and various numerical numbers (for example, "#1", and "#2") in this application are merely used to distinguish between objects for ease of description, but are not intended to limit the scope of the embodiments of this application. For example, distinguish between different operating systems.

Third, "store" in this application may mean being stored in one or more memories. The one or more memories may be separately disposed, or may be integrated into an encoder, a decoder, a processor, or a communications apparatus. Alternatively, a part of the one or more memories may be separately disposed, and a part of the one or more memories are integrated into an encoder, a decoder, a processor, or a communications apparatus. A type of the memory may be a storage medium in any form. This is not limited in this application.

Figure 4:
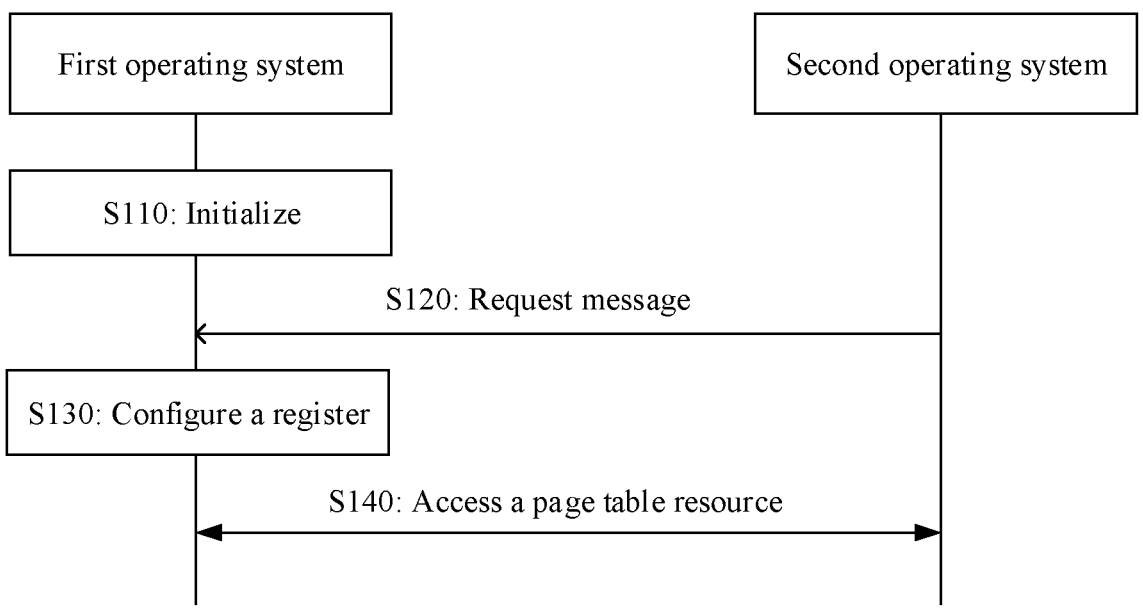
FIG. 4 is a schematic flowchart of a method for a first operating system to access a resource of a second operating system according to an embodiment of this application.

FIG. 4 is a schematic flowchart of a method for a first operating system to access a resource of a second operating system according to an embodiment of this application. Execution bodies include the first operating system and the second operating system, and interaction between the first operating system and the second operating system is used to describe the method for the first operating system to access the resource of the second operating system.

The method for the first operating system to access the resource of the second operating system provided in this application may be applied to the two-operating-system scenario described in FIG. 1. The first operating system and the second operating system form the two-operating-system scenario. Optionally, the first operating system and the second operating system belong to a same architecture. For example, both the first operating system and the second operating system belong to an x86 architecture, or both the first operating system and the second operating system belong to an advanced reduced instruction set computer (RISC) machine (ARM) architecture.

The method for the first operating system to access the resource of the second operating system includes all or some of the following steps.

Step S110: Initialize the first operating system.

In this embodiment of this application, the initializing the first operating system includes:

The first operating system stores a kernel page table and a user page table in the first operating system in a page table memory of low-order address space.

It should be understood that how the first operating system obtains the kernel page table and the user page table is not limited in this embodiment of this application. Refer to a specification in a current protocol. The first operating system includes a module for generating the kernel page table and the user page table.

The kernel page table in this embodiment of this application includes a segment of memory stored in a global directory of a primary kernel page, and is not directly used by hardware. Content in the kernel page table is shared by all processes. The kernel page table is maintained and updated by a kernel. The user page table in this embodiment of this application includes a page table of each process, and is placed in a page directory of the process.

It should be further understood that specific forms of the kernel page table and the user page table are not limited in this embodiment of this application. For details, refer to descriptions in the current protocol. This embodiment of this application mainly relates to a register that stores a memory configuration of a page table.

After storing the kernel page table and the user page table in the first operating system in the page table memory of the low-order address space, the first operating system configures the page table memory of the low-order address space to a first register. The first register corresponds to first address space. The first operating system reserves second address space based on high-order address space of the second operating system. The first address space is used by a user and the kernel, the first address space is different from the second address space, and the second address space is address space in virtual address space in the first operating system other than the used first address space.

It should be understood that a virtual memory design is used in a current operating system. A Linux system is used as an example. Generally, 32-bit Linux virtual memory address space is divided into 0 to 3 G user space and 3 to 4 G kernel space. 0 to 3 G is understood as low-order address space, and 3 to 4 G is understood as high-order address space. The high-order address space is used by a Linux system kernel and cannot be accessed by an application. The low-order address space is accessed by a user program.

A difference between the first operating system and the current operating system is that both the kernel space and the user space of the first operating system in this embodiment of this application use the first address space. The first address space is understood as low-order address space in virtual memory address space of the first operating system, and the first register may be understood as a register corresponding to the low-order address space. The second address space is reserved by the first operating system, and is not used by the kernel of the first operating system. The second address space is understood as high-order address space. To be specific, in an initialization process of the first operating system, high-order address space of the first operating system is reserved based on the high-order address space in virtual address space of the second operating system. For example, if the second operating system is a 32-bit Linux system, the virtual address space of the second operating system is divided into 0 to 3 G user space and 3 to 4 G kernel space. In this case, the first operating system may reserve the 3 to 4 G high-order address space of the first operating system.

It should be understood that, to enable the first operating system to reuse a register configuration of a kernel page table of the second operating system to configure a second register corresponding to the high-order address space of the first operating system, address space division of the first operating system should be consistent with address space division of the second operating system. For example, virtual address space division of the first operating system and the second operating system is that 0 to 3 G is low-order address space, and 3 to 4 G is high-order address space. That virtual address space division of the first operating system and the second operating system is that 0 to 3 G is low-order address space, and 3 to 4 G is high-order address space is merely an example, and does not constitute any limitation on the protection scope of this application. For other possible division of low-order address space and high-order address space of a system, refer to an existing division manner. Details are not described in this application.

Further, to improve security performance, when both the kernel space and the user space of the first operating system use low-order address space, and when the first operating system configures the kernel page table, user inaccessible permission control is added to a kernel page table entry. When the first operating system configures the user page table, the PXN protection is added to a user page table entry. The PXN protection is to prevent the kernel from executing user code.

To enable the first operating system to access a resource in kernel space of the second operating system, in this embodiment of this application, the first operating system can obtain register configuration information of the kernel page table of the second operating system.

In a possible implementation, the first operating system actively obtains the register configuration information of the kernel page table of the second operating system. For example, an obtaining module is deployed in the first operating system, and is configured to obtain the register configuration information of the kernel page table of the second operating system.

In another possible implementation, the first operating system receives the register configuration information that is of the kernel page table of the second operating system and that is from the second operating system. For example, a receiving module is deployed in the first operating system, and is configured to receive the register configuration information of the kernel page table of the second operating system.

Further, the first operating system may further obtain kernel symbol table information of the second operating system, parse the kernel symbol table information, obtain a conversion relationship of the high-order address space of the second operating system, obtain user page table base address information of a user process, read user page table entry content level by level by using the conversion relationship, and access a resource in a user space of the second operating system. The kernel symbol table information includes information about a user process kernel stack and a structure offset (an address space descriptor of a process (for example, a code segment, a data segment, a stack, or file system information), or a process descriptor). An address range in which the code segment or the data segment is used is obtained based on the kernel stack information and the structure offset.

Optionally, to enable the first operating system to obtain the register configuration information of the kernel page table of the second operating system and/or the kernel symbol table information of the second operating system, a kernel driver module may be deployed in the second operating system, and the kernel driver module is configured to obtain the kernel symbol table information of the second operating system and the register configuration information of the kernel page table of the second operating system.

In a possible implementation, after obtaining the kernel symbol table information of the second operating system and the register configuration information of the kernel page table of the second operating system, the kernel driver module may store the information in a local storage module of the second operating system such that the first operating system can actively obtain the information.

In another possible implementation, after obtaining the kernel symbol table information of the second operating system and the register configuration information of the kernel page table of the second operating system, the kernel driver module may initiate an active request, to notify the first operating system of the obtained kernel symbol table information of the second operating system and the register configuration information of the kernel page table of the second operating system, and the method procedure shown in FIG. 4 may further include:

Step S120: The second operating system sends a request message to the first operating system.

The request message carries the kernel symbol table information and/or the register configuration information of the kernel page table of the second operating system, and the request message is used to request the first operating system to modify a register configuration of the first operating system.

Further, because the request message includes the kernel symbol table information of the second operating system and/or the register configuration information of the kernel page table of the second operating system, after the first operating system receives the request message, the first operating system may configure the register configuration of the first operating system based on the received register configuration information of the kernel page table of the second operating system such that a register configuration corresponding to the high-order address space of the first operating system is the same as a register configuration corresponding to the high-order address space of the second operating system. It may be understood that the register configuration corresponding to the high-order address space of the first operating system reuses the register configuration corresponding to the high-order address space of the second operating system. That is, the method procedure shown in FIG. 4 further includes step S130: The first operating system configures a register.

In a possible implementation, before the request message is received, a client application (CA) is deployed in the first operating system, and the CA configures, based on the received register configuration information of the kernel page table of the second operating system, the register configuration corresponding to the high-order address space of the first operating system.

In another possible implementation, after the request message is received, the CA is deployed in the first operating system, and the CA configures, based on the received register configuration information of the kernel page table of the second operating system, the register configuration corresponding to the high-order address space of the first operating system.

In still another possible implementation, when the request message is received, the CA is deployed in the first operating system, and the CA configures, based on the received register configuration information of the kernel page table of the second operating system, the register configuration corresponding to the high-order address space of the first operating system.

It should be understood that a time when the first operating system deploys the CA is not limited in this embodiment of this application.

The register configuration of the kernel page table of the second operating system includes configurations such as an address translation controller, a memory attribute controller, and a high-order space page table base address register. After the first operating system completes the register configuration corresponding to the high-order address space of the first operating system, the first operating system and the second operating system have a same high-order space page table base address register configuration.

Optionally, after receiving the request message, the first operating system may obtain the kernel symbol table information of the second operating system, and the first operating system may store the kernel symbol table information of the second operating system.

Further, when the first operating system configures, based on the register configuration information of the kernel page table of the second operating system, a second register corresponding to the high-order address space of the first operating system, and after the first operating system enables the high-order address space, the first operating system has permission to directly access the resource of the kernel space of the second operating system, and can access high-order address space the same as that of the second operating system.

After receiving the kernel symbol table information, the first operating system can obtain the conversion relationship of the high-order address space of the second operating system, obtain the user page table base address information of the user process, read the user page table entry content level by level by using the conversion relationship, and access the resource in the user space of the second operating system.

Figure 5:
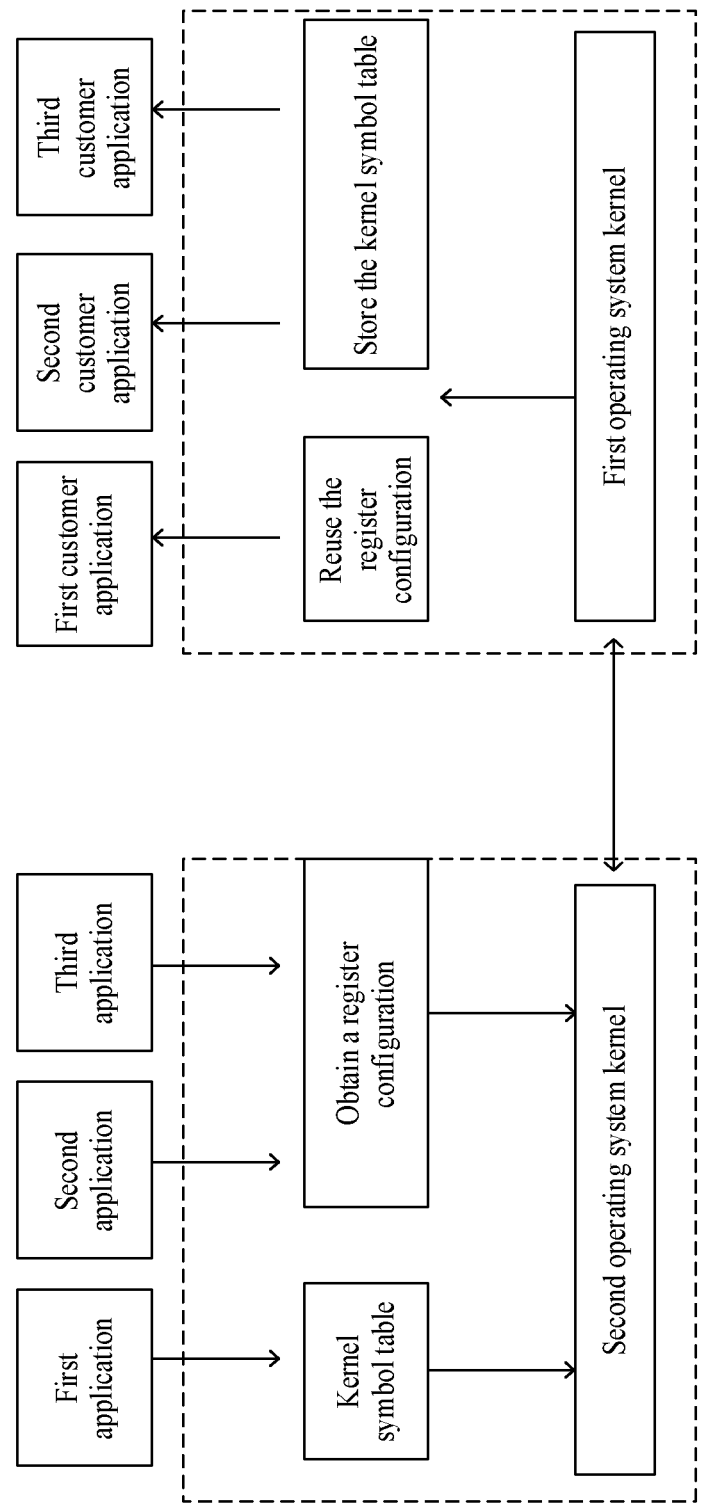
FIG. 5 is a schematic block diagram in which a first operating system accesses a resource of a second operating system according to an embodiment of this application.

For ease of intuitive understanding, the procedures shown in step S110 to step S130 are described in detail with reference to FIG. 5. FIG. 5 is a schematic block diagram in which the first operating system accesses the resource of the second operating system according to this embodiment of this application.

Optionally, an example in which the first operating system is a 64-bit ARM operating system, and the second operating system is a Linux OS is used to further describe how the first operating system reuses the register configuration of the second operating system. The Linux OS usually uses 128 T addresses of the 0x0000-0000-0000-0000 to 0x0000-7fff-ffff-f000 in 64-bit address space for the user space, and 0xffff-8000 to 0000-0000 are system kernel space addresses.

When the first operating system is initialized, the kernel page table and the user page table are stored in a same continuous memory, and a memory base address is configured to TTBR0_EL1 (a low-order space page table base address register). Both the kernel space and the user space use low-order address space. Further, when configuring the kernel page table, the first operating system adds user-mode inaccessible permission control, configures the user page table, and adds the PXN protection. In addition, it needs to be ensured that a range of the high-order address space of the first operating system is consistent with a range of kernel address space of the second operating system (for example, it is ensured that 0xffff-8000~0000-0000 in the 64-bit address space of the first operating system are high-order address space).

Further, the kernel driver module is deployed in the Linux OS, to obtain kernel symbol table information and some key system register configurations (register configuration information related to the kernel page table, for example, register configurations such as TCR_EL1 (an address translation controller configuration), TTBR1_EL1 (a low-order space page table base address register), or MAIR_EL1 (a memory attribute register)) of the Linux OS, and send the obtained kernel symbol table information and some key system register configurations to the first operating system such that the first operating system reuses a high-order address space configuration of the second operating system. Therefore, the first operating system can access high-order address space range data of the second operating system.

The x86 operating system has a similar architecture. A register configuration of the x86 operating system also needs to ensure that a range of high-order address space of a local operating system (the first operating system) should be consistent with a range of kernel address space of a peer operating system (the second operating system). A register of the x86 operating system and a register of the ARM operating system may have different names, but share a same principle. Details are not described in this application.

Further, the first operating system may access a user page table resource of the second operating system by using software (software relationship: Table Entry[(VA>>(39−Level×9)) & 0x1FF], where Level is a page table level). That is, the method procedure shown in FIG. 4 further includes step S140: The first operating system accesses the user page table resource of the second operating system.

Figure 6:
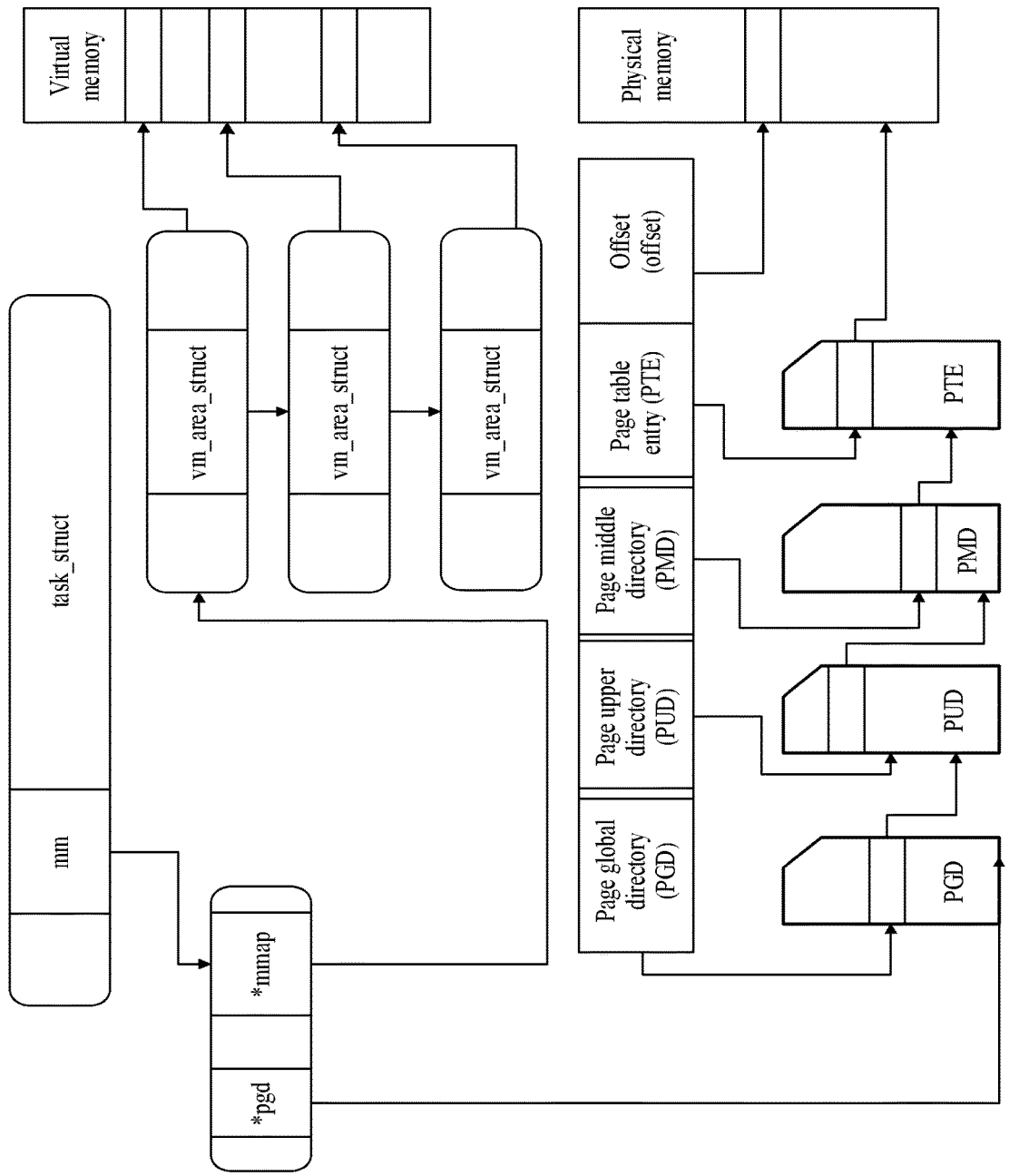
FIG. 6 is a schematic flowchart of user page table access according to an embodiment of this application.

Further, the first operating system accesses the user page table resource of the second operating system in a traversal manner. The following uses a specific example to describe a specific procedure in which the first operating system accesses the user page table resource of the second operating system. FIG. 6 is a schematic flowchart of user page table access according to this embodiment of this application. It is assumed that the second operating system is a four-level paging mechanism: A PGD includes addresses of several PUDs, the PUD includes addresses of several PMDs, the PMD includes addresses of several PTEs, and each PTE points to one page frame. The first operating system needs to access physical page frame content corresponding to a VA. A specific access procedure is as follows:

First, the first operating system utilizes an existing high-order address conversion relationship (there is no need to copy the page table resource of the second operating system as shown above) to obtain a VA corresponding to a user process PGD in the second operating system, read entry content of a level-1 page table entry based on an offset into the VA and by using PGD[(VA>>(39−3×9)) & 0x1FF], and determine a level-2 page table entry (a physical address of a PUD entry) that includes the VA and that corresponds to the entry content. Second, it is determined whether the level-2 page table entry is a valid entry. If the level-2 page table entry is a valid entry, PUD[(VA>>(39−2×9)) & 0x1FF] is used to obtain a physical address of the level-2 page table entry, and a real page frame corresponding to a process code segment can be finally obtained level by level. Finally, virtual-real conversion is performed on a PTE page frame by using a high-order address linear relationship of the second operating system such that the first operating system can access content of a virtual address of the second operating system. Taking only four simple linear conversion steps can quickly obtain a resource on a specific physical page frame of the second operating system. That is, the first operating system may quickly access the user page table resource by using a software-based quick index.

The first operating system may access, through an address bus, all peripherals including a physical memory, an input/output (I/O) device, and the like connected to the address bus. However, an access address sent from the first operating system is not among physical addresses of these peripherals on the address bus, but a virtual address. An MMU converts the virtual address into a physical address and sends the physical address from the address bus. A conversion relationship between the virtual address and the physical address on the MMU needs to be created. If no mapping from the virtual address to the physical address is created, or an invalid address is accessed because of an improperly designed program, the MMU notifies the first operating system of generating a page fault exception.

In this embodiment of this application, when an exception occurs when the first operating system accesses the resource of the second operating system, the first operating system sends exception-related information to the second operating system. Further, a remote procedure call (RPC) service is deployed in the first operating system, and the RPC service sends the exception-related information to the second operating system.

Figure 7:
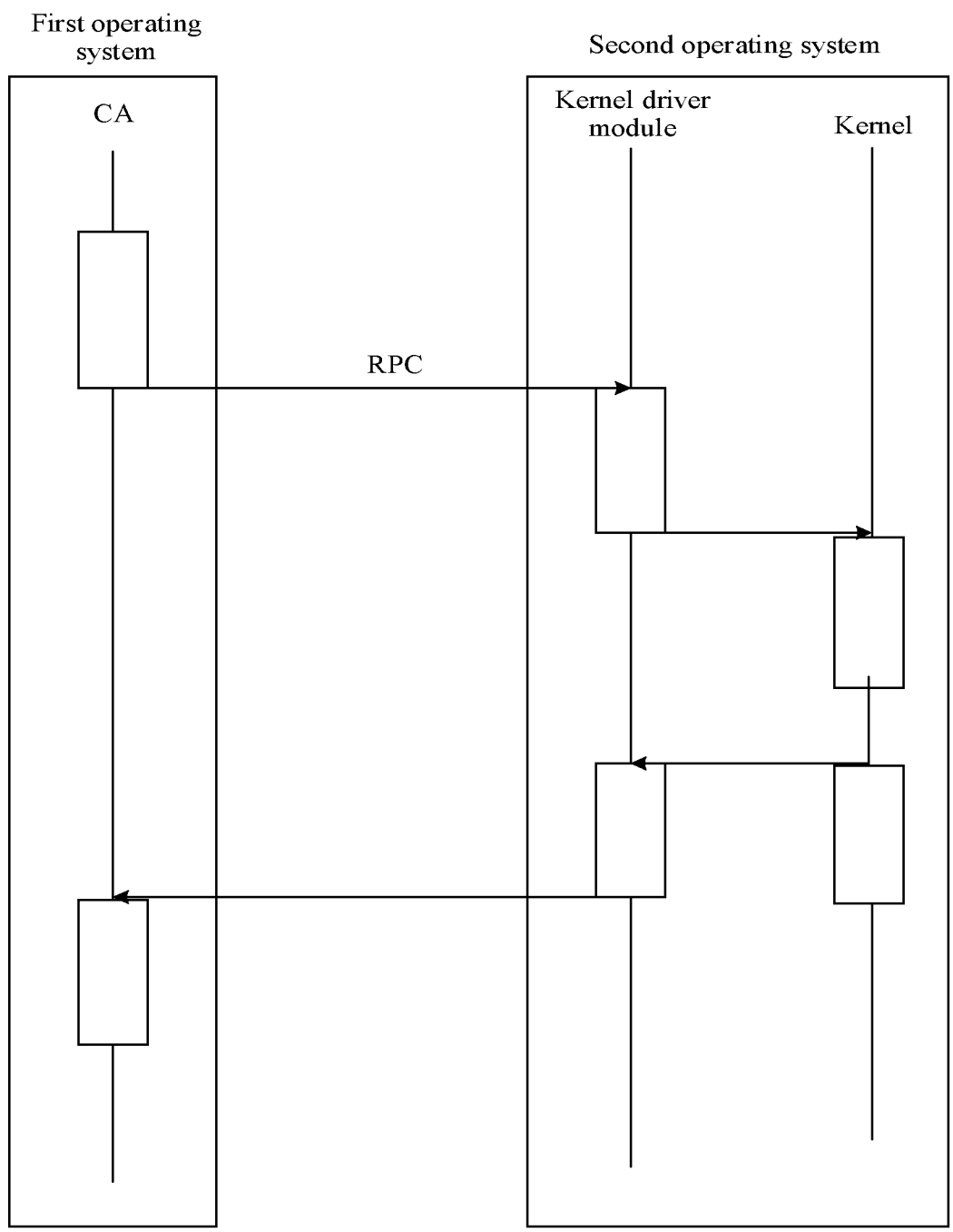
FIG. 7 is a schematic flowchart of page fault exception processing according to an embodiment of this application.

For example, when the first operating system accesses a user process of the second operating system, and software quickly indexes a user page frame, an empty entry is accessed, and the first operating system cannot normally read application content of the second operating system. In this case, the first operating system needs to additionally design a page fault processing mechanism. FIG. 7 is a schematic flowchart of page fault exception processing according to this embodiment of this application.

The RPC service is deployed in the first operating system, and a CA program in the first operating system transparently transmits a page fault RPC request back to the second operating system by using the RPC service, and actively transfers a page fault process number and a virtual address corresponding to a page fault. After receiving the RPC request from the first operating system, the second operating system sets a related memory page by using a page fault processing program of the second operating system, locks the memory page in a memory, and replies to the RPC request of the first operating system. The CA in the first operating system performs subsequent corresponding processing based on a result returned by the second operating system. If the second operating system successfully returns the result, the second operating system can normally access the user process resource; otherwise, the access is denied.

Figure 8:
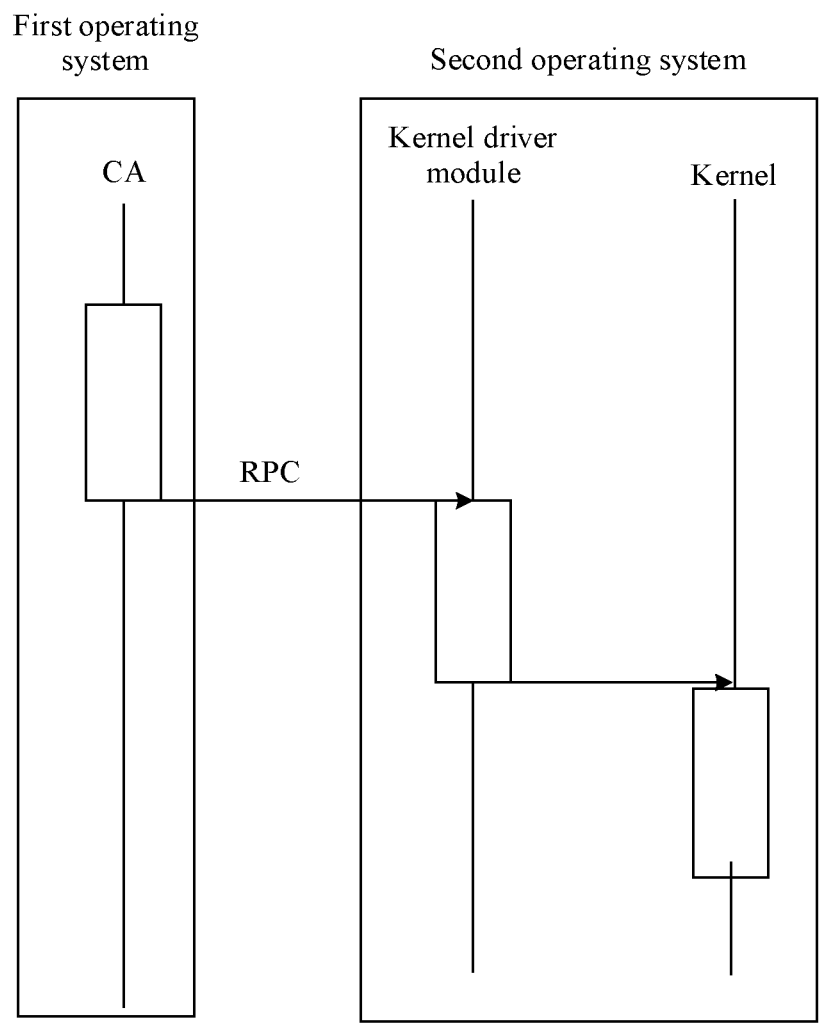
FIG. 8 is a schematic flowchart of exception processing according to an embodiment of this application.

For another example, when a data abort exception occurs when the first operating system accesses an address, the first operating system needs to design an exception processing mechanism. FIG. 8 is a schematic flowchart of exception processing according to this embodiment of this application. When the first operating system performs exception processing, the first operating system first needs to analyze an address source. If an address access error occurs in the first operating system, the address access error is processed in an exception processing program of the first operating system, otherwise, the first operating system routes, by using the RPC service, the address access error back to the second operating system for processing, and the second operating system performs processing.

Figure 9:
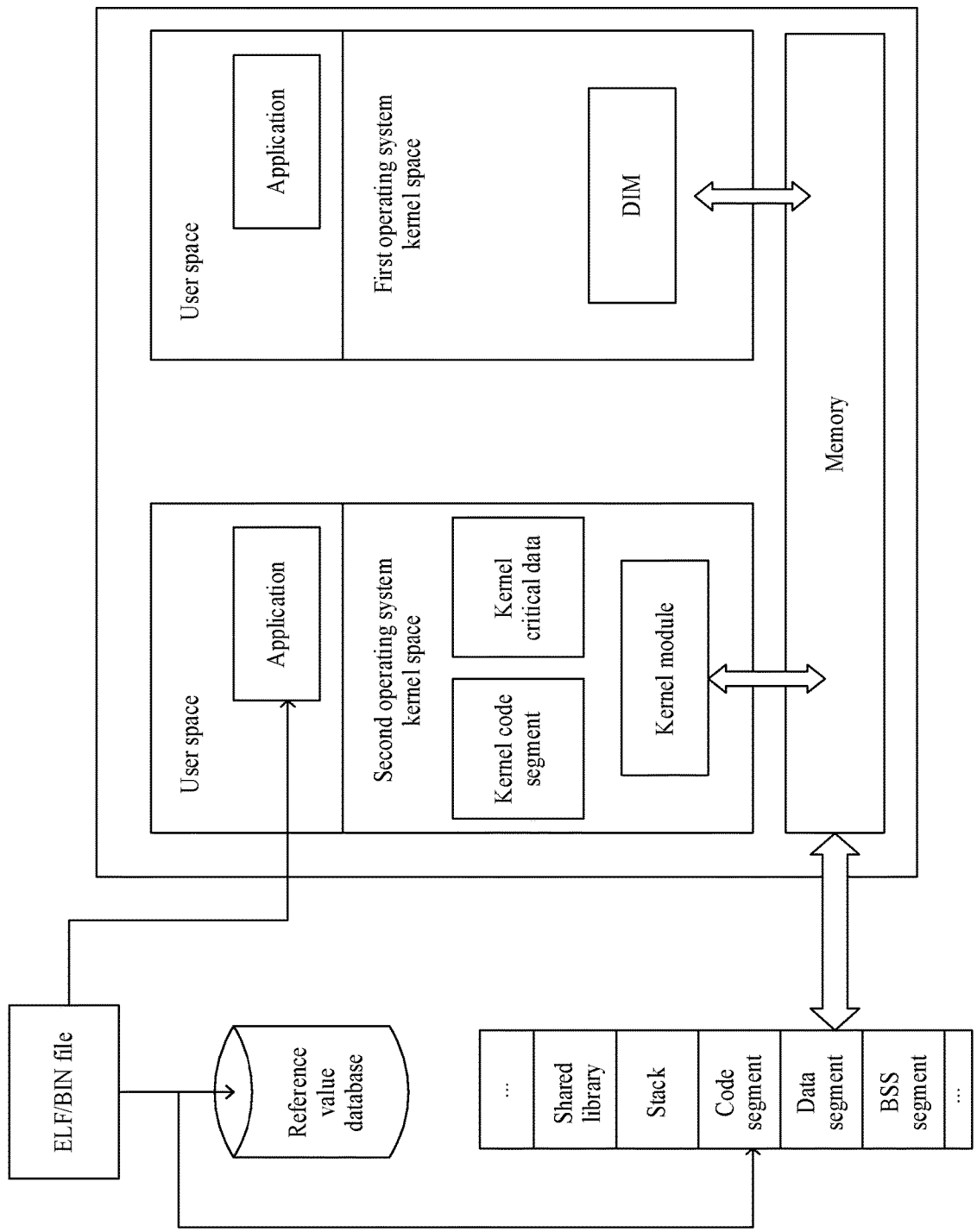
FIG. 9 is a schematic block diagram of operating system software according to an embodiment of this application.

In a possible implementation, the method shown in FIG. 4 may be applied to the heterogeneous operating system shown in FIG. 1. Further, a software operating system corresponding to the heterogeneous operating system shown in FIG. 1 is shown in FIG. 9. FIG. 9 is a schematic block diagram of operating system software according to an embodiment of this application. A block started by symbol (BSS) segment is usually a memory area used to store an uninitialized global variable in a program. The BSS segment is a static memory allocation.

A data segment is usually a memory area used to store an initialized global variable in the program. The data segment is a static memory allocation.

A code segment (text segment) is usually a memory area used to store program execution code. A size of this area is determined before the program runs, and the memory area is usually read-only. Some architectures also allow the code segment to be written, that is, the program can be modified. The code segment may also contain some read-only constant variables such as string constants.

A stack is a local variable temporarily created by a user to store the program. The stack may be considered as a memory area for storing and exchanging temporary data. The stack is allocated by the operating system. Memory application and reclamation are managed by the system.

A binary (BIN) file is a raw binary file that contains only machine code. In addition to the machine code, an ELF file also contains additional information such as a loading address, a running address, a relocation table, and a symbol table of a segment. Specific division of the operating system software is not limited in this application. For details, refer to software division of two current operating systems.

The operating system software is divided into two domains: a secure domain and a non-secure domain. The secure domain corresponds to a security isolation operating system, and the non-secure domain corresponds to a mainstream operating system. A dynamic integrity measurement (DIM) module may be deployed in the security isolation operating system. In this embodiment of this application, the security isolation operating system may be referred to as a local operating system, or may be referred to as a first operating system, and the mainstream operating system may be referred to as a peer operating system, or may be referred to as a second operating system. In other words, the dynamic integrity measurement module may be deployed in the first operating system in this application, to provide security protection for the second operating system. The method for the first operating system to access the resource of the second operating system provided in this application may be applied to the autonomous driving field. For example, the second operating system interacts with a user, and software security service access is deployed in the first operating system.

It should be understood that sequence numbers of the foregoing processes do not mean execution sequences in the foregoing method embodiments. The execution sequences of the processes should be determined based on functions and internal logic of the processes, and should not be construed as any limitation on the implementation processes of the embodiments of this application.

The foregoing describes in detail, with reference to FIG. 4 to FIG. 9, the method for the first operating system to access the resource of the second operating system provided in the embodiments of this application. The following describes in detail, with reference to FIG. 10 to FIG. 13, an apparatus for the first operating system to access the resource of the second operating system provided in the embodiments of this application.

Figure 10:
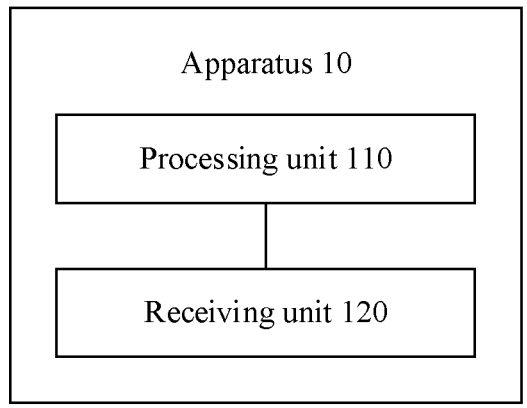
FIG. 10 is a schematic diagram of an apparatus 10 for a first operating system to access a resource of a second operating system according to this application.

FIG. 10 is a schematic diagram of an apparatus 10 for a first operating system to access a resource of a second operating system according to this application. As shown in FIG. 10, the apparatus 10 includes a processing unit 110 and a receiving unit 120.

The processing unit 110 is configured to: configure kernel space and user space of the first operating system in first address space of the first operating system, and reserve second address space for the second operating system. Virtual memory address space of the first operating system includes the first address space and the second address space.

The receiving unit 120 is configured to obtain register configuration information of a kernel page table of the second operating system.

The processing unit 110 is further configured to configure a second register of the first operating system based on the register configuration information of the kernel page table of the second operating system. The second register corresponds to the second address space of the first operating system.

The processing unit 110 is further configured to access a resource in kernel space of the second operating system by using the second address space.

The apparatus 10 completely corresponds to the first operating system in the method embodiment, and the apparatus 10 may be the first operating system in the method embodiment, or a chip or a function module inside the first operating system in the method embodiment. A corresponding unit of the apparatus 10 is configured to perform corresponding steps performed by the first operating system in the method embodiment shown in FIG. 4.

The processing unit 110 in the apparatus 10 performs the steps implemented or processed internally by the first operating system in the method embodiment, for example, performs step S110 of initialization in FIG. 4, and is further configured to perform step S130 of configuring a register in FIG. 4.

The receiving unit 120 performs the step of receiving by the first operating system in the method embodiment, for example, performs step S120 of receiving a request message from the second operating system in FIG. 4.

The apparatus 10 may further include a sending unit, configured to perform the step of sending by the first operating system, for example, send information to another device. The sending unit and the receiving unit 120 may form a transceiver unit, and have both receiving and sending functions. The processing unit 110 may be a processor. The sending unit may be a transmitter, and the receiving unit 120 may be a receiver. The receiver and the transmitter may be integrated to form a transceiver.

Figure 11:
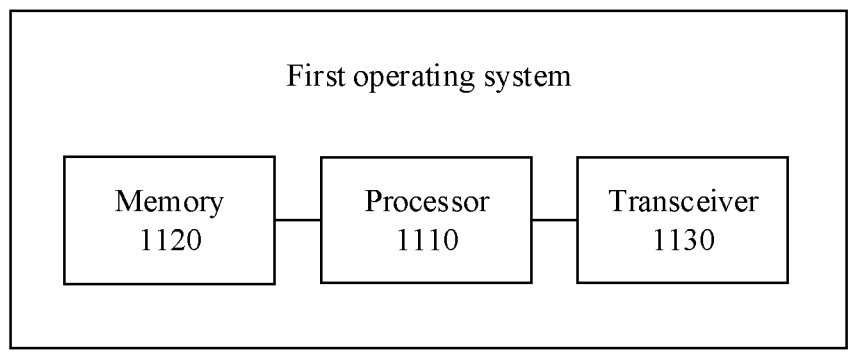
FIG. 11 is a schematic diagram of a structure of a first operating system applicable to an embodiment of this application.

FIG. 11 is a schematic diagram of a structure of a first operating system applicable to an embodiment of this application. The first operating system may be applied to the two operating systems shown in FIG. 1. For ease of description, FIG. 11 shows only main components of the first operating system. As shown in FIG. 11, the first operating system includes a processor 1110 (corresponding to the processing unit 110 shown in FIG. 10), a memory 1120, and a transceiver 1130 (corresponding to the receiving unit 120 shown in FIG. 10). The processor is configured to control the transceiver to send and receive information, the memory is configured to store a computer program, and the processor is configured to invoke and run the computer program from the memory, to perform corresponding procedures and/or operations performed by the first operating system in the method for the first operating system to access the resource of the second operating system provided in this application. Details are not described herein again.

A person skilled in the art may understand that for ease of description, FIG. 11 shows only one memory and only one processor. In an actual first operating system, there may be a plurality of processors and memories. The memory may also be referred to as a storage medium, a storage device, or the like. This is not limited in this embodiment of this application.

Figure 12:
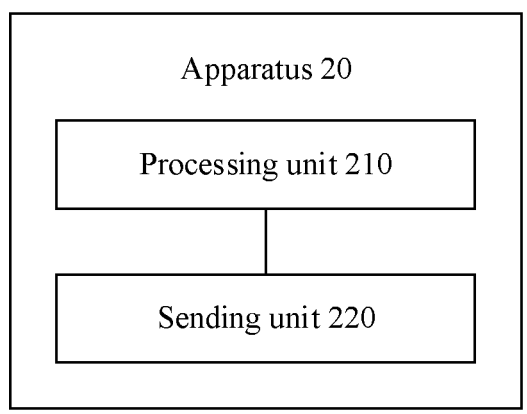
FIG. 12 is a schematic diagram of an apparatus 20 for a first operating system to access a resource of a second operating system according to this application.

FIG. 12 is a schematic diagram of an apparatus 20 for a first operating system to access a resource of a second operating system according to this application. As shown in FIG. 12, the apparatus 20 includes a processing unit 210 and a sending unit 220.

The processing unit 210 is configured to obtain register configuration information of a kernel page table of the second operating system.

The sending unit 220 is configured to send the register configuration information of the kernel page table of the second operating system to the first operating system.

The apparatus 20 completely corresponds to the second operating system in the method embodiment, and the apparatus 20 may be the second operating system in the method embodiment, or a chip or a function module inside the second operating system in the method embodiment. A corresponding unit of the apparatus 20 is configured to perform corresponding steps performed by the second operating system in the method embodiment shown in FIG. 4.

The sending unit 220 in the apparatus 20 performs the steps of sending by the second operating system in the method embodiment, for example, performs step S120 of sending a request message to the first operating system in FIG. 4.

The processing unit 210 in the apparatus 20 performs the steps implemented or processed internally by the second operating system in the method embodiment.

The apparatus 20 may further include a receiving unit configured to perform the step of receiving by the second operating system, for example, receive information sent by another device. The receiving unit and the sending unit 210 may form a transceiver unit, and have both receiving and sending functions. The processing unit 110 may be a processor. The sending unit 210 may be a transmitter. The receiving unit may be a receiver. The receiver and the transmitter may be integrated to form a transceiver.

Figure 13:
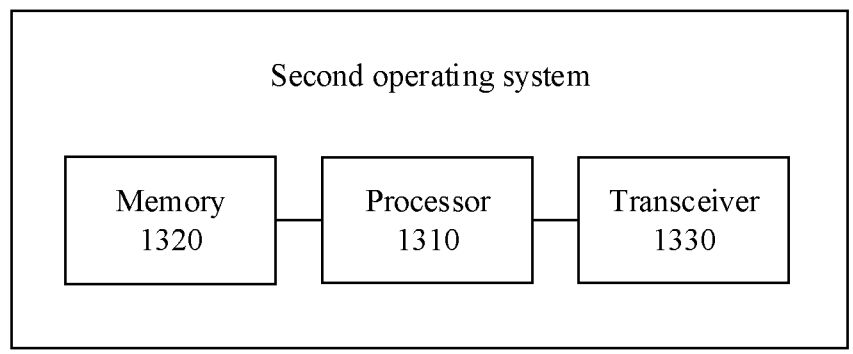
FIG. 13 is a schematic diagram of a structure of a second operating system applicable to an embodiment of this application.

FIG. 13 is a schematic diagram of a structure of a second operating system applicable to an embodiment of this application. The second operating system may be applied to the two operating systems shown in FIG. 1. For ease of description, FIG. 13 shows only main components of the second operating system. As shown in FIG. 13, the first operating system includes a processor 1310 (corresponding to the processing unit 210 shown in FIG. 12), a memory 1320, and a transceiver 1330 (corresponding to the sending unit 220 shown in FIG. 12). The processor is configured to control the transceiver to send and receive information, the memory is configured to store a computer program, and the processor is configured to invoke and run the computer program from the memory, to perform corresponding procedures and/or operations performed by the first operating system in the method for the first operating system to access the resource of the second operating system provided in this application. Details are not described herein again.

An embodiment of this application further provides an electronic device, including the first operating system and the second operating system. The electronic device may further include another peripheral shown in FIG. 3. Both the first operating system and the second operating system may be disposed in the processor 310.

This application further provides a computer-readable storage medium. The computer-readable storage medium stores instructions. When the instructions are run on a computer, the computer is enabled to perform the steps performed by the first operating system in the method shown in FIG. 4.

This application further provides a computer-readable storage medium. The computer-readable storage medium stores instructions. When the instructions are run on a computer, the computer is enabled to perform the steps performed by the second operating system in the method shown in FIG. 4.

This application further provides a computer program product including instructions. When the computer program product runs on a computer, the computer is enabled to perform the steps performed by the first operating system in the method shown in FIG. 4.

This application further provides a computer program product including instructions. When the computer program product runs on a computer, the computer is enabled to perform the steps performed by the second operating system in the method shown in FIG. 4.

This application further provides a chip, including a processor. The processor is configured to read and run a computer program stored in a memory, to perform corresponding operations and/or procedures performed by the first operating system in the method for the first operating system to access the resource of the second operating system provided in this application. Optionally, the chip further includes the memory, the memory is connected to the processor through a circuit or a wire, and the processor is configured to read and execute the computer program in the memory. Further, optionally, the chip further includes a communications interface, and the processor is connected to the communications interface. The communications interface is configured to receive data and/or information that needs to be processed, and the processor obtains the data and/or information from the communications interface, and processes the data and/or information. The communications interface may be an I/O interface, an interface circuit, an output circuit, an input circuit, a pin, a related circuit, or the like on the chip. The processor may alternatively be a processing circuit or a logic circuit.

This application further provides a chip, including a processor. The processor is configured to read and run a computer program stored in a memory, to perform corresponding operations and/or procedures performed by the second operating system in the method for the first operating system to access the resource of the second operating system provided in this application. Optionally, the chip further includes the memory, the memory is connected to the processor through a circuit or a wire, and the processor is configured to read and execute the computer program in the memory. Further, optionally, the chip further includes a communications interface, and the processor is connected to the communications interface. The communications interface is configured to receive data and/or information that needs to be processed, and the processor obtains the data and/or information from the communications interface, and processes the data and/or information. The communications interface may be an input/output interface, an interface circuit, an output circuit, an input circuit, a pin, a related circuit, or the like on the chip. The processor may alternatively be a processing circuit or a logic circuit.

It should be understood that the foregoing chip may also be replaced by a chip system, and details are not described herein.

In this application, the terms "include", "have" and any other variants mean to cover the non-exclusive inclusion, for example, a process, method, system, product, or device that includes a series of steps or units is not necessarily limited to those steps or units that are clearly listed, but may include other steps or units not expressly listed or inherent to such a process, method, product, or device.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods according to the embodiments of this application. The foregoing storage medium includes: any medium that can store program code, such as a USB flash drive, a removable hard disk, a read-only memory (ROM), a random access memory (RAM), a magnetic disk, or an optical disc.

In addition, the term "and/or" in this application describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may represent the following seven cases: Only A exists, only B exists, only C exists, both A and B exist, both A and C exist, both C and B exist, and A, B, and C exist.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus comprising:
   a first operating system has a first memory area and virtual memory address space comprising first address space and second address space; and
   a second operating system has a kernel space and a kernel page table,
   wherein a processor of the first operating system is configured to:
      obtain register configuration information of the kernel page table and kernel symbol table information of the second operating system;
      configure, based on the register configuration information, the first memory area corresponding to the second address space; and
      access a resource in the kernel space using the second address space.

2. The apparatus of claim 1, wherein the first operating system further comprises a dynamic integrity measurement module configured to provide a security service for the second operating system by accessing the resource of the second operating system.

3. The apparatus of claim 1, wherein the first address space is a low-order address space, and wherein the second address space is a high-order address space.

4. The apparatus of claim 3, wherein a first range of the high-order address space is consistent with a second range of a kernel address space of the second operating system.

5. The apparatus of claim 1, wherein the register configuration information comprises configuration information of an address translation controller, configuration information of a memory attribute controller, and configuration information of a kernel space page table base address register.

6. A method implemented by a first operating system, comprising:
obtaining register configuration information of a kernel page table and kernel symbol table information of a second operating system, wherein the first operating system has virtual memory address space comprising first address space and second address space;
configuring, based on the register configuration information, a first memory area of the first operating system, wherein the first memory area corresponds to the second address space; and
accessing a resource in kernel space of the second operating system using the second address space.

7. The method of claim 6, further comprising providing a dynamic integrity measurement module to provide a security service for the second operating system by accessing the resource of the second operating system.

8. An apparatus comprising:
a first operating system has a first kernel space, user space, a first address space, a second address space, and a register, wherein the register comprises a first memory area and a second memory area;
a second operating system has a first kernel page table and a second kernel space; and
a processor configured to:
configure the first kernel space and user space in the first address space, wherein the first address space corresponds to the first memory area;
control the first operating system to obtain kernel symbol table information of the second operating system and register configuration information of the first kernel page table;
configure the second address space with the register configuration information of the first kernel page table, wherein the second address space corresponds to the second memory area; and
control the first operating system to access a first resource in the second kernel space using the second address space.

9. The apparatus of claim 8, wherein the first address space is low-order address space, wherein the second address space is high-order address space, and wherein a first range of the high-order address space is consistent with a second range of kernel address space of the second operating system.

10. The apparatus of claim 8, wherein the processor is further configured to control the first operating system to parse the kernel symbol table information to obtain a conversion relationship of high-order address space of the second operating system, obtain user page table base address information of a user process, read user page table entry content level using the conversion relationship, and access a second resource in user space of the second operating system.

11. The apparatus of claim 8, wherein the processor is further configured to:
store a second kernel page table and a user page table of the first operating system in a page table memory of the first address space; and
configure the page table memory to the first memory area.

12. The apparatus of claim 11, wherein the processor is further configured to:
add user inaccessible permission control to the second kernel page table; and
add privileged execute never (PXN) protection to the user page table.

13. The apparatus of claim 8, wherein the processor is further configured to reserve the second address space based on a high-order address space of the second operating system.

14. The apparatus of claim 8, wherein the processor is further configured to control the first operating system to receive a request message from the second operating system, and wherein the request message carries the kernel symbol table information and the register configuration information of the first kernel page table.

15. The apparatus of claim 8, wherein the first operating system comprises a client application (CA), and wherein the processor is further configured to modify, in a CA initialization process, a configuration of the register based on the register configuration information.

16. The apparatus of claim 8, wherein the register configuration information comprises configuration information of an address translation controller, configuration information of a memory attribute controller, and configuration information of a kernel space page table base address register.

17. The apparatus of claim 8, wherein the first operating system comprises a dynamic integrity measurement system configured to provide a security service for the second operating system.

18. The apparatus of claim 17, wherein the processor is further configured to control the dynamic integrity measurement system to access the first resource.

19. The apparatus of claim 8, wherein the processor is further configured to control the first operating system to send exception-related information to the second operating system when an exception occurs while the first operating system accesses the resource.

20. The apparatus of claim 19, wherein the first operating system comprises a remote procedure call (RPC) service, and wherein the processor is further configured to control the RPC service to send the exception-related information to the second operating system.

* * * * *